(12) United States Patent
Sumiya et al.

(10) Patent No.: US 8,078,358 B2
(45) Date of Patent: Dec. 13, 2011

(54) VEHICLE DISPLAY UNIT

(75) Inventors: Minoru Sumiya, Nagoya (JP); Shirou Sugimoto, Kariya (JP)

(73) Assignee: Denso Corporation, Kariya (JP)

( * ) Notice: Subject to any disclaimer, the term of this patent is extended or adjusted under 35 U.S.C. 154(b) by 433 days.

(21) Appl. No.: 12/412,461

(22) Filed: Mar. 27, 2009

(65) Prior Publication Data

US 2009/0248245 A1 Oct. 1, 2009

(30) Foreign Application Priority Data

| Mar. 27, 2008 | (JP) | ................................. 2008-084518 |
| Dec. 17, 2008 | (JP) | ................................. 2008-321425 |
| Dec. 17, 2008 | (JP) | ................................. 2008-321426 |
| Dec. 17, 2008 | (JP) | ................................. 2008-321427 |

(51) Int. Cl.
*B60K 37/00* (2006.01)
*B62D 25/14* (2006.01)
*G08B 5/00* (2006.01)

(52) U.S. Cl. ............. 701/36; 116/28 R; 180/90; 296/70; 307/10.1; 340/438; 340/815.4

(58) Field of Classification Search ................ 116/28 R, 116/62.1, 74, 202, 284, 286, 288; 180/90; 307/9.1, 10.1, 10.8; 340/438, 441, 407.1, 340/815.4, 815.42, 815.45, 815.46, 815.55, 340/815.57, 815.78, 815.83, 815.86, 384.1, 340/384.6; 345/33, 173, 175–177, 204; 701/36, 701/211; 296/70; *B60K 37/02, 37/04, 37/06*
See application file for complete search history.

(56) References Cited

U.S. PATENT DOCUMENTS

| 2,824,298 | A | * | 2/1958 | Ross ............................. 340/441 |
| 2,952,011 | A | * | 9/1960 | Hayes .......................... 340/670 |
| 3,919,688 | A | * | 11/1975 | Schick ......................... 340/441 |
| 5,663,866 | A | * | 9/1997 | Ichikawa et al. .............. 361/643 |
| 6,333,697 | B1 | * | 12/2001 | Kumazawa et al. ....... 340/815.4 |
| 6,396,394 | B1 | * | 5/2002 | Suzuki et al. .............. 340/425.5 |

(Continued)

FOREIGN PATENT DOCUMENTS

FR 2761029 A1 * 9/1998

(Continued)

OTHER PUBLICATIONS

Japanese Office Action dated Nov. 2, 2010 for corresponding Japanese Application No. 2008-321427 with English Translation.

(Continued)

*Primary Examiner* — Paul N Dickson
*Assistant Examiner* — Laura Freedman
(74) *Attorney, Agent, or Firm* — Nixon & Vanderhye, PC

(57) ABSTRACT

A vehicle display unit for a vehicle includes a display panel, a transmitting panel, a peripheral wall member, and a sounding body. The display panel faces a vehicle interior of the vehicle and displays visual information to a vehicle occupant of the vehicle. The transmitting panel is disposed on a vehicle interior side of the display panel. The visual information is transmitted to the vehicle occupant through the transmitting panel. The peripheral wall member surrounds a space between the display panel and the transmitting panel in a circumferential direction of the display panel. The sounding body is attached on an outer circumferential surface of the peripheral wall member and is configured to provide auditory information for the vehicle occupant by generating a sound wave. The peripheral wall member has a communicating hole, which opens toward the sounding body and communicates with the space.

18 Claims, 8 Drawing Sheets

U.S. PATENT DOCUMENTS

| | | | |
|---|---|---|---|
| 6,705,659 B2 * | 3/2004 | Suzuki et al. | 296/70 |
| 6,778,074 B1 * | 8/2004 | Cuozzo | 340/441 |
| 7,173,827 B2 * | 2/2007 | Sugimoto et al. | 361/760 |
| 7,196,635 B2 * | 3/2007 | Sumiya et al. | 340/815.78 |
| 7,596,448 B2 * | 9/2009 | Suzuki et al. | 701/200 |
| 7,629,874 B2 * | 12/2009 | Araki et al. | 340/425.5 |
| 2007/0052703 A1 * | 3/2007 | Seto | 345/419 |
| 2009/0174682 A1 * | 7/2009 | Bowden et al. | 345/173 |

FOREIGN PATENT DOCUMENTS

| | | | |
|---|---|---|---|
| JP | 62-166133 | | 7/1987 |
| JP | 63269738 A | * | 11/1988 |
| JP | Y2-H3-26762 | | 6/1991 |
| JP | 07257234 A | * | 10/1995 |
| JP | 08276764 A | * | 10/1996 |
| JP | 2000-172273 | | 6/2000 |
| JP | 3094073 | | 3/2003 |
| JP | 2005-306167 | | 11/2005 |
| JP | 2006-36096 | | 2/2006 |
| JP | 2006-96241 | | 4/2006 |
| JP | 2006-119047 | | 5/2006 |
| JP | 2006-173817 | | 6/2006 |
| JP | 2006192973 A | * | 7/2006 |
| JP | 2006-232040 | | 9/2006 |
| JP | 2007055430 A | * | 3/2007 |
| JP | 2007080808 A | * | 3/2007 |
| JP | 2007-126000 | | 5/2007 |
| JP | 2007238069 A | * | 9/2007 |
| JP | 2008-137634 | | 6/2008 |
| JP | 2008-179237 | | 8/2008 |
| WO | WO 0107282 | * | 2/2001 |

OTHER PUBLICATIONS

Japanese Office Action dated Dec. 14, 2010 issued in corresponding Japanese Application No. 2008-321426 with English Translation.

* cited by examiner

VEHICLE DISPLAY UNIT

CROSS REFERENCE TO RELATED APPLICATION

This application is based on and incorporates herein by reference Japanese Patent Application No. 2008-84518 filed on Mar. 27, 2008, Japanese Patent Application No. 2008-321425 filed on Dec. 17, 2008, Japanese Patent Application No. 2008-321426 filed on Dec. 17, 2008, and Japanese Patent Application No. 2008-321427 filed on Dec. 17, 2008.

BACKGROUND OF THE INVENTION

1. Field of the Invention

The present invention relates to a vehicle display unit.

2. Description of Related Art

Conventionally, a vehicle display unit configured to provide a user of a vehicle with auditory information as well as visual information is known. As a kind of such a vehicle display unit, a unit, in which a buzzer serving as a sounding body which provides auditory information by emitting a sound wave is disposed behind a display panel which provides visual information, is disclosed in JP2006-119047A and Japanese Utility Model Registration No. 3094073. In the unit disclosed in JP2006-119047A and Japanese Utility Model Registration No. 3094073, the sound wave emitted from the buzzer propagates to the outside of the unit through a through hole on a cover that covers the buzzer behind the display panel, and consequently, auditory information is transmitted to the user.

In the case of the vehicle display unit disclosed in JP2006-119047A, Japanese Utility Model Registration No. 3094073, the sound wave, which was emitted from the buzzer and has propagated to the outside of the unit from the inside of the cover behind the display panel through the through hole, reflects repeatedly in a clearance between the unit and an instrument panel of a vehicle. It would appear that the sound wave which leaks out of this clearance reaches the user. When the sound wave repeats its reflection in the clearance between the unit and the instrument panel, the sound wave which reaches the user has considerably deteriorated sound pressure level compared to the sound wave which the buzzer originally emits. As a result, the auditory information may not be transmitted to the user sufficiently due to influence of environmental factors in the vehicle, such as a car audio.

In addition, a configuration whereby an exciter is provided at an upper part of a side surface of a unit is proposed in JP2008-137634A. However, in this configuration as well, it is difficult to obtain a high sound pressure level.

SUMMARY OF THE INVENTION

The present invention addresses the above disadvantages. Thus, it is an objective of the present invention to provide a vehicle display unit which transmits auditory information accurately to a user together with visual information.

To achieve the objective of the present invention, there is provided a vehicle display unit for a vehicle. The unit includes a display panel, a transmitting panel, a peripheral wall member, and a sounding body. The display panel faces a vehicle interior of the vehicle and is configured to display visual information to a vehicle occupant of the vehicle. The transmitting panel is disposed on a vehicle interior side of the display panel. The visual information is transmitted to the vehicle occupant through the transmitting panel. The peripheral wall member surrounds a space between the display panel and the transmitting panel in a circumferential direction of the display panel. The sounding body is attached on an outer circumferential surface of the peripheral wall member and is configured to provide auditory information for the vehicle occupant by generating a sound wave. The peripheral wall member has a communicating hole, which opens toward the sounding body and communicates with the space.

To achieve the objective of the present invention, there is also provided a vehicle display unit for a vehicle. The unit includes a display panel, a transmitting panel, a peripheral wall member, a sounding body, and a leading means. The display panel faces a vehicle interior of the vehicle and is configured to display visual information to a vehicle occupant of the vehicle. The transmitting panel is disposed on a vehicle interior side of the display panel. The visual information is transmitted to the vehicle occupant through the transmitting panel. The peripheral wall member surrounds a space between the display panel and the transmitting panel in a circumferential direction of the display panel. The sounding body is attached on an outer circumferential surface of the peripheral wall member and is configured to provide auditory information for the vehicle occupant. The leading means is for leading a sound of the sounding body to a vehicle interior side of the transmitting panel.

Furthermore, to achieve the objective of the present invention, there is provided a vehicle display unit for a vehicle. The unit includes a display panel, a transmitting panel, a peripheral wall member, a sounding body, and a fixing means. The display panel faces a vehicle interior of the vehicle and is configured to display visual information to a vehicle occupant of the vehicle. The transmitting panel is disposed on a vehicle interior side of the display panel. The visual information is transmitted to the vehicle occupant through the transmitting panel. The peripheral wall member surrounds a space between the display panel and the transmitting panel in a circumferential direction of the display panel. The sounding body is attached on an outer circumferential surface of the peripheral wall member and is configured to provide auditory information for the vehicle occupant. The fixing means is for fixing an outer circumferential portion of the transmitting panel partly to the peripheral wall member such that the transmitting panel is vibrated by a sound of the sounding body.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
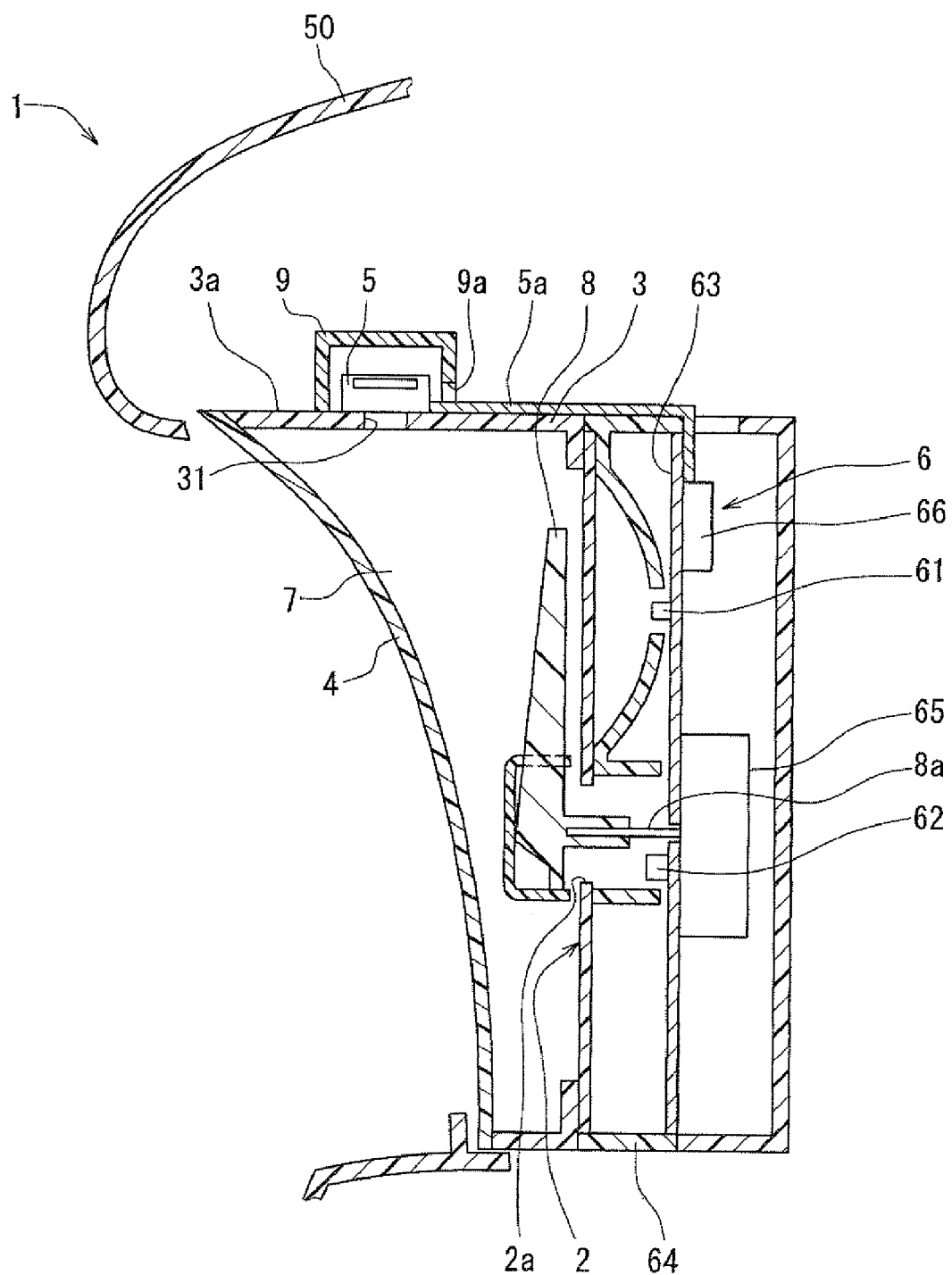
FIG. 1 is a diagram illustrating a vehicle display unit according to a first embodiment of the invention, and is a sectional view taken along a line I-I in FIG. 2.
Figure 2:
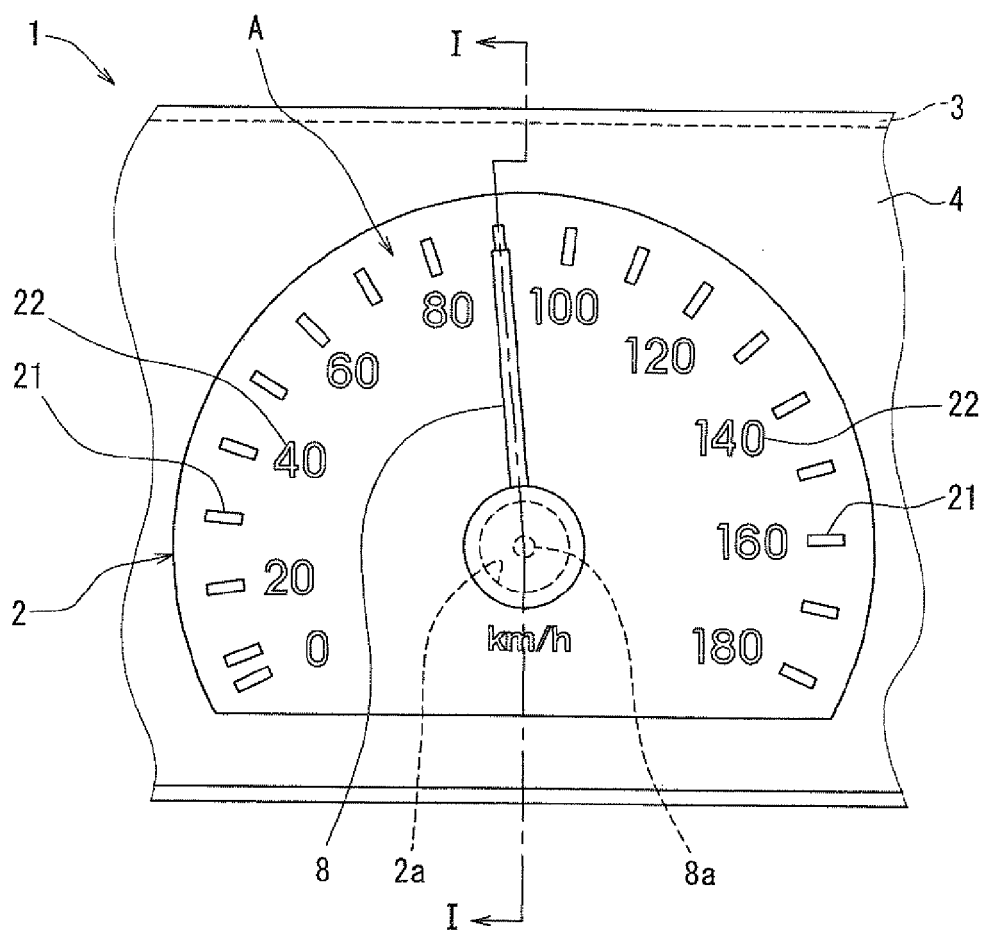
FIG. 2 is a partial front view illustrating the vehicle display unit according to the first embodiment.

FIG. 1 and FIG. 2 show a vehicle display unit 1 according to a first embodiment of the invention. The vehicle display unit 1 is a combination meter arranged in an instrument panel 50 to be visually identified by a driver seated on a driver's seat of a vehicle, and provides a variety of information about the vehicle. Upward and downward directions in FIG. 1 and FIG. 2 generally correspond to upward and downward directions of the vehicle on a horizontal plane.

(Basic Configuration)

The vehicle display unit 1 includes a display panel 2, a pointer 8, a facing plate 3, a transmitting panel 4, and an electric circuit unit 6.

The display panel 2 is formed in the shape of a flat plate from a translucent material such as polycarbonate resin or an acrylic resin. A scale 21 and a character 22, which are display designs, are provided on the display panel 2 to display in a luminescent and translucent manner, and a non-translucent colored layer or a half-translucent colored layer which allows only translucency from behind is provided on a part of the display panel 2 except the scale 21 and the character 22. Together with the pointer 8, the scale 21 and the character 22 constitute a speed indicator A which displays a travel speed of a automobile as visual information. The scale 21 and the character 22 are respectively arranged on a circular arc as well as on a concentric circle with respect to a rotating shaft 8a of the pointer 8. A through hole 2a, through which the rotating shaft 8a of the pointer 8 is inserted, is formed on the display panel 2.

The pointer 8 is formed from a translucent material such as acrylic resin, and is disposed at the front of the display panel 2. The rotating shaft 8a of the pointer 8 extends toward the back of the display panel 2 through the through hole 2a of the display panel 2, and a movement 65 of the electric circuit unit 6 is connected to an end of the backward side of the rotating shaft 8a.

The facing plate 3 as a "peripheral wall member" is formed in a frame shape from a non-translucent resin material, and the facing plate 3 is disposed ahead of the display panel 2 by attaching the facing plate 3 to the display panel 2 along its outer circumferential edge. The transmitting panel 4 is formed like a curved plate from a translucent material such as transparent acrylic resin or transparent glass, and the transmitting panel 4 is arranged at the front of the display panel 2 with a gap between the display panel 2 and the transmitting panel 4 by attaching the panel 4 along an outer circumferential edge of the facing plate 3 on the opposite side of the display panel 2. As a result, in the first embodiment, a space 7 between the transmitting panel 4 and the display panel 2 in the front-back direction is surrounded with the facing plate 3 in the circumferential direction, and visual information displayed on the display panel 2 is transmitted to the driver through the transmitting panel 4. The facing plate 3 and the transmitting panel 4 make the vehicle display unit 1 highly-attractive, and have a function of preventing the entering of dirt, moisture and the like into vehicle display unit 1.

The electric circuit unit 6 includes a circuit board 63 such as a glass epoxy board and a circuit case 64 made of a resin material, and is disposed behind the display panel 2 by attaching the circuit board 63 to the display panel 2 via the circuit case 64. A control circuit 66 including a microcomputer and the like is mounted on the circuit board 63, and light sources 61, 62 including a light emitting diode and the like are mounted on the circuit board 63. The light source 61 is a light source for transmitting and illuminating the display panel 2, and the light source 62 is a light source for transmitting and illuminating the pointer 8 through the through hole 2a of the display panel 2. The movement 65 is mounted on the circuit board 63. The movement 65 is an electric actuator such as a stepping motor or a cross coil rotary machine, and rotates the rotating shaft 8a of the pointer 8.

Figure 3:
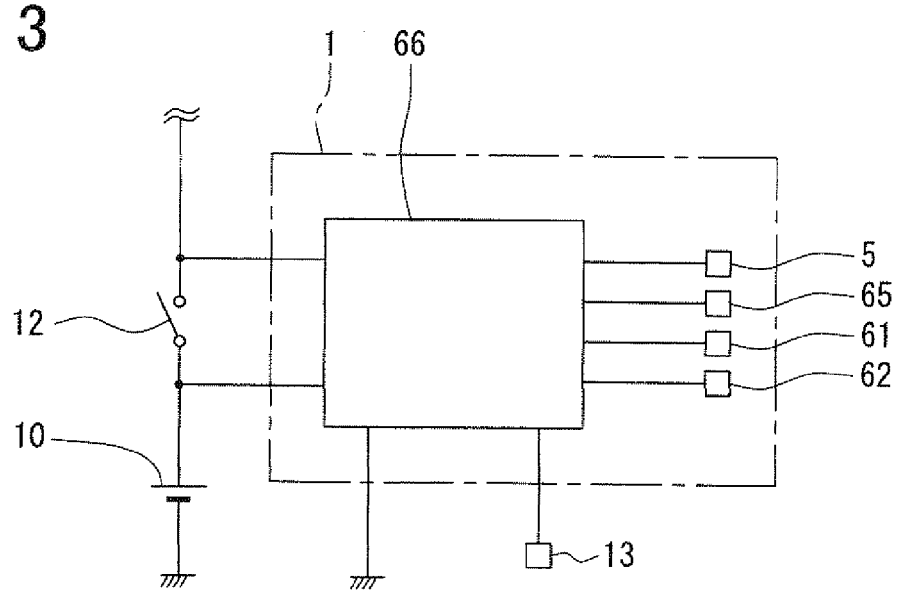
FIG. 3 is a schematic diagram illustrating an electric-circuit configuration of the vehicle display unit according to the first embodiment.

As shown in FIG. 3, electric power is constantly supplied to the control circuit 66 from a battery 10. A ignition switch 12 is electrically connected to the control circuit 66 to detect its operating state. A speed sensor 13 which detects a travel speed of the vehicle is electrically connected to the control circuit 66 to input the detection signal. The light sources 61, 62 and the movement 65 are electrically connected to the control circuit 66 to be light controlled and controlled to rotate the rotating shaft 8a, respectively.

As a result of the above electric circuit configuration, when the ignition switch 12 is turned on, the control circuit 66 detects the ON state thereby to start operation of the vehicle display unit 1. Meanwhile, with respect to workings of the speed indicator A, the display panel 2 and the pointer 8 become luminescent when the light source 61 is lit, and a travel speed of the vehicle is indicated by the pointer 8 when the movement 65 is driven based on the detection signal from the speed sensor 13.

(Characteristic Configuration)

A characteristic configuration of the first embodiment is explained below in detail.

As shown in FIG. 1, the vehicle display unit 1 of the first embodiment further includes a sounding body 5 and a sounding body case 9.

The sounding body 5 is a buzzer, which emits a sound wave for providing the driver with auditory information, for example, a piezoelectric buzzer, which is configured to generate a sound wave as a result of vibrating a vibrating plate formed by gluing together a thin strip including a piezoelectric element and a thin strip made of metal or a resin material, through voltage application to the piezoelectric element. The sounding body 5 is attached on an upper surface part 3a of an outer circumferential surface of the facing plate 3. A communicating hole 31 passing through the facing plate 3 from the upper surface part 3a in a thickness direction of the plate 3 and communicating with the space 7 on an inner circumferential side of the facing plate 3 is formed on the facing plate 3 of the first embodiment. The communicating hole 31 opens toward the sounding body 5 attached on the upper surface part 3a. The transmitting panel 4 of the first embodiment is curved so as to approach the display panel 2 in a direction from the upside to downside, and the communicating hole 31 opens toward the transmitting panel 4. Accordingly, a sound wave emitted from the sounding body 5 easily propagates directly to the transmitting panel 4 through the communicating hole 31 and a space between the display panel 2 and the transmitting panel 4. Thus, a sound pressure level auditory information is increased. As described in greater detail hereinafter, a hole size of the communicating hole 31 may be as large as possible so as to enhance propagation efficiency in propagating a sound wave from the sounding body 5 to the space 7.

The sounding body 5 located forward of the display panel 2 is electrically connected to the control circuit 66, which is arranged behind the display panel 2, via the lead wire 5a. Accordingly, in the first embodiment employing the electric circuit configuration shown in FIG. 3, when the ignition switch 12 is turned on and thereby the operation of the vehicle display unit 1 is started, a sound wave is emitted from the sounding body 5 if required, through the control of the sounding body 5 by the control circuit 66.

As shown in FIG. 1, the sounding body case 9 as a "covering member" is formed in a cup shape from a non-translucent resin material. An opening of the sounding body case 9 is attached on the upper surface part 3a of the facing plate 3 with the sounding body 5 accommodated in the sounding body case 9. The sounding body case 9 covers the sounding body 5 from the side opposite to the communicating hole 31 in such an attachment manner. An insertion hole 9a is formed on the sounding body case 9, and by inserting the lead wire 5a through the insertion hole 9a, the electric connection is made between the sounding body 5 and the control circuit 66.

In the first embodiment having such a characteristic configuration, a sound wave emitted by the sounding body 5 attached on the upper surface part 3a of the facing plate 3 propagates in the communicating hole 31 which opens toward the sounding body 5. The sound wave that has propagated in the communicating hole 31, which opens toward the transmitting panel 4, propagates across the space 7 from the opening so as to reach the transmitting panel 4. As a result, the transmitting panel 4 vibrates by the sound wave, and this vibration propagates to the driver due to its reduction to the vibration of air in front of the transmitting panel 4. Accordingly, the driver is provided with auditory information. A propagation path of the sound wave which propagates directly to the transmitting panel 4 through the inside of the communicating hole 31 and the space 7 is shorter than before. Thus, a loss because of path length of the propagation path is limited. As a result, a sound pressure level of auditory information is ensured. Although depending on materials of related components such as the facing plate 3, due to the existence of the communicating hole 31 or as the number of holes 31 is larger, for example, a sound pressure of a frequency of hundreds of hertz (Hz) or lower is improved, and on the other hand, a sound pressure of a frequency of about 1 kHz or higher is reduced. Therefore, the sound pressure may be adjusted by varying the size or number of the communicating holes 31 according to a frequency of a sound wave emitted from the sounding body 5.

A part of the sound wave, which has propagated to the space 7 through the inside of the communicating hole 31, sometimes propagates to the transmitting panel 4 after its reflection on the panels 2, 4 and the facing plate 3 around the space 7. Accordingly, the transmitting panel 4 is vibrated by the sound wave through the reflections as well, and thereby the sound pressure level of auditory information is increased. Furthermore, by resonance of the sound wave through the reflections with the sound wave which has propagated directly to the transmitting panel 4 as described above, vibration amplitude of the transmitting panel 4 is made larger. As a result, the sound pressure level of auditory information is made even higher.

Additionally, a sound wave emitted from the sounding body 5 toward the instrument panel 50 on the side opposite to the communicating hole 31 is reflected by the sounding body case 9 covering the sounding body 5 from the side opposite. Accordingly, by propagating the sound wave reflected by the sounding body case 9 to the transmitting panel 4 through the communicating hole 31, the above reflected wave is used for the supply of auditory information. Moreover, the sound wave reflected by the sounding body case 9 and then propagated to the transmitting panel 4 resonates with the sound wave propagated directly to the transmitting panel 4 as described above, and thereby the vibration amplitude of the transmitting panel 4 is made larger. Therefore, a remarkable effect is achieved upon improvement in the sound pressure level of auditory information.

In addition, by, for example, adjusting thickness of the transmitting panel 4 to be 1 mm or less so as to bring the frequency of the sound wave which the sounding body 5 emits close to a natural frequency of the transmitting panel 4, a sound pressure level-enhancing effect as well as a vibrational stability-enhancing effect as a result of sympathetic vibration of the transmitting panel 4 are also produced.

Thus, according to the first embodiment, the vehicle display unit 1 which transmits accurately auditory information together with visual information to the driver is realized.

Furthermore, in the first embodiment, the sounding body 5 is provided separately from the circuit board 63, and these are connected by the lead wire 5a. Accordingly, flexibility is increased in a mounting position of the sounding body 5 on the outer circumferential surface of the facing plate 3. Therefore, the mounting position of the sounding body 5 is set at an optimal position where the sound wave emitted from the sounding body 5 is transmitted to the driver as auditory information having a desired sound pressure level. Because a space between the unit 1 and the instrument panel 50, which is conventionally a dead space as shown in FIG. 1, is used for the mounting position of the sounding body 5 in the first embodiment in the first place, auditory information having a desired sound pressure level is provided for the driver without placing restraints on an appearance configuration of the unit 1 whose design is valued. In addition, the mounting position of the sounding body 5 may be on a lower surface portion of the outer circumferential surface of the facing plate 3 or on a side surface portion of the outer circumferential surface of the plate 3, as long as it is a portion of the outer circumferential surface of the plate 3 where the communicating hole 31 opens.

Second Embodiment

Figure 4:
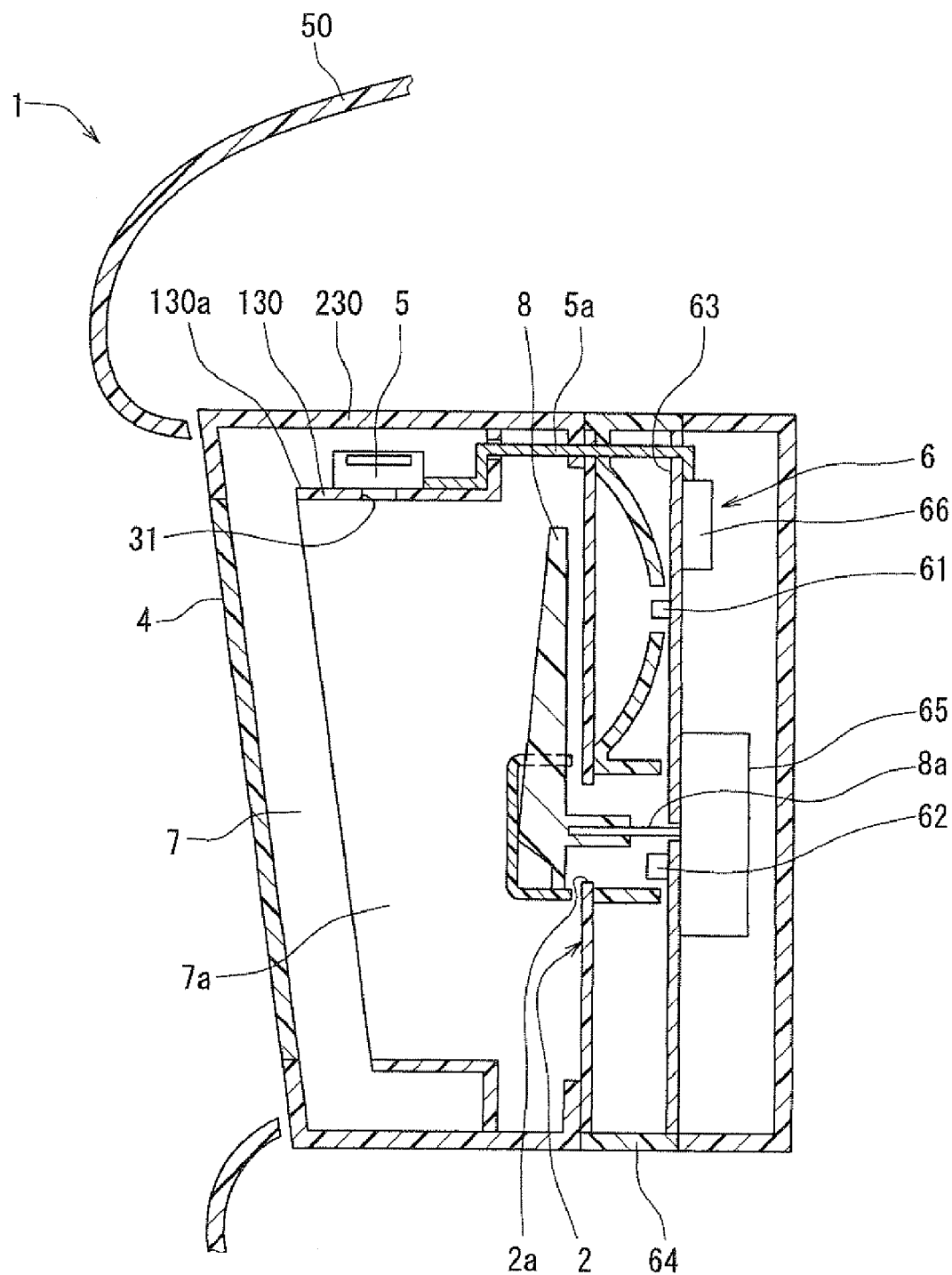
FIG. 4 is a diagram illustrating a vehicle display unit according to a second embodiment of the invention, and is a sectional view corresponding to FIG. 1.

A second embodiment of the invention is a modification of the first embodiment, and as shown in FIG. 4, facing plates 130, 230, which overlap with each other, are used for the second embodiment.

More specifically, the inner facing plate 130 which is smaller than the facing plate 230 is disposed on an inner circumferential side of the outer facing plate 230 which connects panels 2, 4 in the front-back direction similar to the facing plate 3 of the first embodiment. The inner facing plate 130 is formed in a frame shape from a non-translucent resin material. The facing plate 130 may be formed separately from the outer facing plate 230, or integrally with the outer facing plate 230 depending on its shape. In the present example in particular, the facing plate 130 is formed integrally with the facing plate 230. The inner facing plate 130 is separated on the front side from a display panel 2, and is away backward from a transmitting panel 4. Accordingly, the inner facing plate 130 of the second embodiment surrounds a part 7a of a space 7 between the panels 2, 4 in the circumferential direction as a "peripheral wall member".

A communicating hole 31 opens and a sounding body 5 is attached on an outer circumferential surface of the inner facing plate 130 (upper surface part 130a in FIG. 4), similar to the upper surface part 3a of the facing plate 3 of the first embodiment. Accordingly, the outer facing plate 230 covers the sounding body 5 from the side opposite to the communicating hole 31 as a "covering member".

In the second embodiment, the outer facing plate 230 is vibrated by a sound wave which propagates from the sounding body 5 to the opposite side of the communicating hole 31, and thereby vibration of the transmitting panel 4 which is attached to the facing plate 230 is promoted. As a result, the sound wave emitted from the sounding body 5 resonates efficiently at the transmitting panel 4. Therefore, a sound pressure level of auditory information is improved.

Third Embodiment

Figure 5:
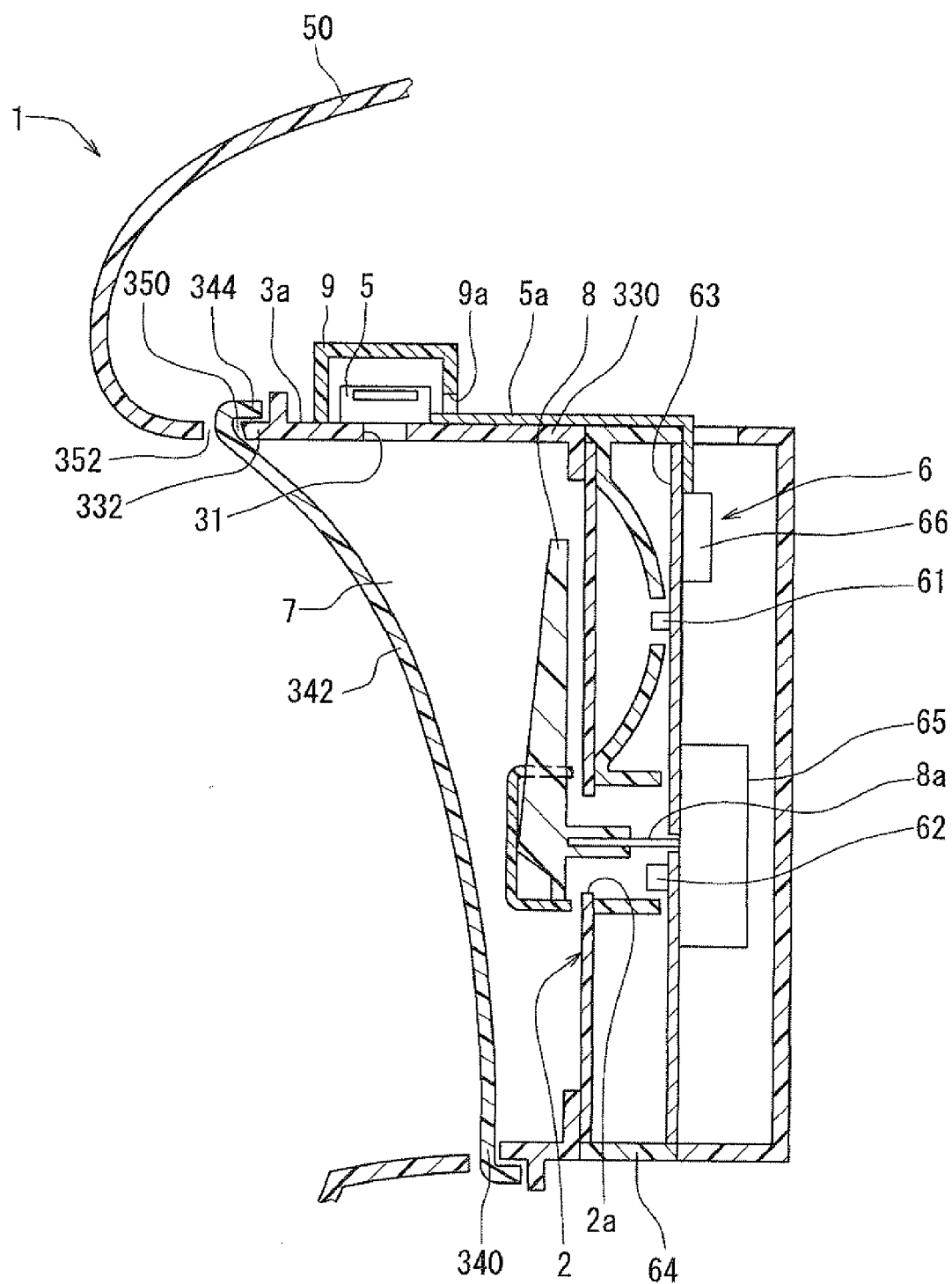
FIG. 5 is a diagram illustrating a vehicle display unit according to a third embodiment of the invention, and is a sectional view corresponding to FIG. 1.

A third embodiment of the invention is a modification of the first embodiment, and in the third embodiment, as shown in FIG. 5, a transmitting panel 340 is fitted and attached around a facing plate 330 as a "peripheral wall member" on which the communicating hole 31 is formed and a sounding body 5 and a sounding body case 9 are attached.

More specifically, the transmitting panel 340 has a fitted part 344 which is crooked backward from an outer circumferential edge of a main body part 342, which is curved similar to the first embodiment. The fitted part 344 is fitted on an end 332 of the facing plate 330 on the opposite side to the display panel 2 over the outer circumferential side of the end 332. As a result of disposing the outer circumferential edge of the main body part 342 between an instrument panel 50 and the facing plates 330, separation of the fitted part 344 from the facing plate 330 is prevented. Consequently, in the third embodiment, the fitted part 344 of the transmitting panel 340 is attached to the end 332 of the facing plate 330 on the opposite side from the display panel 2 with a clearance 350 therebetween, and the facing plate 330 is set to bridge a gap between the panels 2, 340. In the third embodiment, a clearance 352 is formed between the instrument panel 50 and the outer circumferential edge of the main body part 342 as well.

In the third embodiment, as a sound wave which reaches the front of the transmitting panel 340 through the inside of the communicating hole 31 as well as the space 7 between the panels 2, 340 from the sounding body 5, not only a sound wave which propagates via the main body part 342, but a sound wave which propagates via the clearance 350 between the fitted part 344 and the facing plate 330, and the clearance 352 between the main body part 342 and the instrument panel 50 in this order appears. Thus, the number of propagation paths for the sound wave from the sounding body 5 to the front of the transmitting panel 340 increases, and thereby a sound pressure level of auditory information in the front of the transmitting panel 340 is made even higher.

Fourth Embodiment

Figure 6:
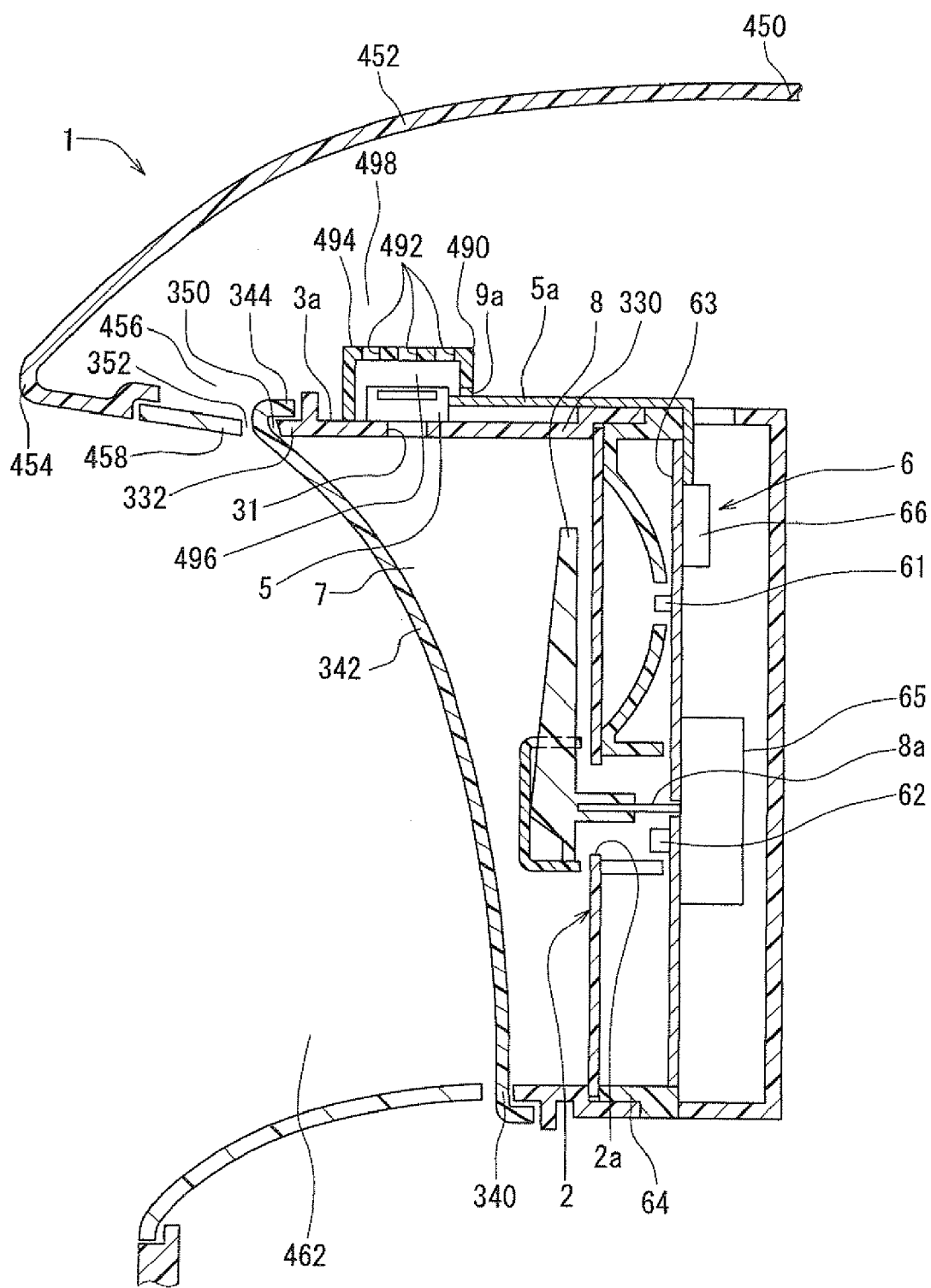
FIG. 6 is a diagram illustrating a vehicle display unit according to a fourth embodiment of the invention, and is a sectional view corresponding to FIG. 1.

A fourth embodiment of the invention is a modification of the third embodiment. In the fourth embodiment, as shown in FIG. 6, a communicating hole 492 as a "cover communicating hole" is formed on a sounding body case 490 as a "covering member", and an instrument panel 450 is provided as a "propagation member."

More specifically, a predetermined number of the communicating holes 492 pass through a bottom 494 of the sounding body case 490 in a reverse cup state on an opposite side of a sounding body 5 from a communicating hole 31. Accordingly, the communicating hole 492 communicates between an internal space 496 of the sounding body case 490 accommodating the sounding body 5 and an exterior space 498 of the sounding body case 490 covered with a top plate part 452 of the instrument panel 450 on an outer circumferential side of the facing plate 330.

The instrument panel 450 made of a resin material has a hood part 454, which projects from the top plate part 452 to the front of the transmitting panel 340 and is folded toward the transmitting panel 340 side (i.e., backward). An internal space 456 of the hood part 454 communicates with the exterior space 498 of the sounding body case 490 surrounded by the top plate part 452 and the facing plate 330. A folded side end 458 of the hood part 454 and an outer circumferential edge of a main body part 342 of the transmitting panel 340 define a clearance 352 therebetween, and accordingly the clearance 352 communicates between the internal space 456 of the hood part 454 and a front space 462 of the transmitting panel 340. In the fourth embodiment, a part of the hood part 454 including the folded side end 458 is divided from the remainder of the hood part 454 and a main body member which is formed into the top plate part 452, and attached to the main body member. Alternatively, the above division does not need be made.

In the fourth embodiment, a sound wave emitted from the sounding body 5 toward the bottom 494 side in the internal space 496 of the sounding body case 490 is reflected to the side of the communicating hole 31 as a "peripheral wall communicating hole" by the bottom 494. In addition, the above sound wave leaks out to the exterior space 498 of the sounding body case 490 through the communicating hole 492 of the bottom 494. Meanwhile, decrease in the sound pressure level of the sound wave, which has passed through the communicating hole 492 having a small propagation loss, is limited. Thus, after the leakage of the sound wave into the exterior space 498, the sound wave enters the top plate part 452. As a result, the incident wave to the top plate part 452 is reflected by the top plate part 452, and propagates from the exterior space 498 to the internal space 456 of the hood part 454. Furthermore, the reflected wave to the internal space 456 enters directly into the clearance 352 between the hood part 454 and the main body part 342, or enters after its multipath reflection at the hood part 454. Accordingly, the wave reaches the front space 462 of the transmitting panel 340. In other words, according to the instrument panel 450 of the fourth embodiment, the wave leaking out from the internal space 496 is propagated to the front space 462 through the single reflection and multipath reflection.

Consequently, in the fourth embodiment, not only the wave which propagates via the main body part 342 or the clearances 350, 352 from the space 7 between the panels 2, 340, but also the wave which propagates via the clearance 352 from the spaces 498, 456 surrounded by the instrument panel 450 appears as a sound wave which reaches the front of the transmitting panel 340 from the sounding body 5. As a result, the number of propagation paths for the sound wave from the sounding body 5 to the front of the transmitting panel 340 further increases, and thus, the sound pressure level of auditory information at the front of the transmitting panel 340 is remarkably increased.

Fifth Embodiment

Figure 7:
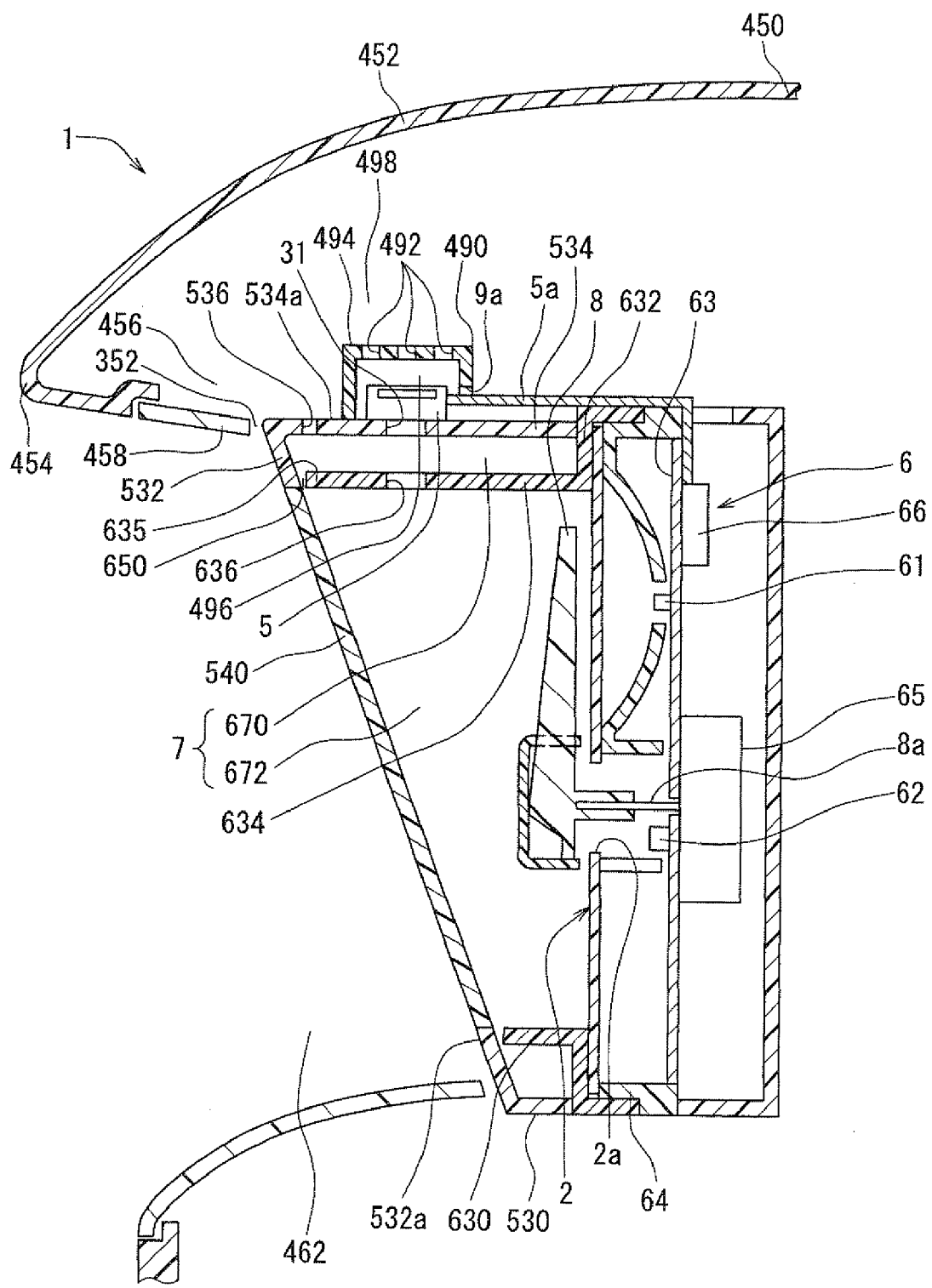
FIG. 7 is a diagram illustrating a vehicle display unit according to a fifth embodiment of the invention, and is a sectional view corresponding to FIG. 1.

A fifth embodiment of the invention is a modification of the fourth embodiment. In the fifth embodiment, as shown in FIG. 7, a facing plate 630 as a "partition member" is inserted in an inner circumferential side of a main body case 530 as a "peripheral wall member" on which a communicating hole 31 is formed and a sounding body 5 and a sounding body case 490 are attached.

More specifically, the main body case 530 is formed in a frame shape from a non-translucent resin material, and arranged ahead of the display panel 2 as a result of attaching the case 530 to an outer circumferential edge of the display panel 2 via the facing plate 630.

An end 532 of the main body case 530 on the opposite side from the display panel 2 is crooked to the inner circumferential side so as to be formed into an annular decorative board part 532, and a front part 532a of the decorative board part 532 is colored, ornamented and so on. A clearance 352 is formed between the decorative board part 532 and a folded side end 458 of a hood part 454 of an instrument panel 450. An outer circumferential edge of a transmitting panel 540 like a flat plate is attached to an internal circumference edge of the decorative board part 532. Accordingly, the main body case 530 is connected between the display panel 2 and the transmitting panel 540 spaced from the panel 2 ahead of the panel 2 so as to surround the space 7 between the panels 2, 540 in the circumferential direction.

The sounding body 5 and the sounding body case 490 which covers the body 5 are attached on an upper surface part 534a which is an outer circumferential surface of a cylindrical wall portion 534 of the main body case 530 extending backward from the decorative board part 532. A predetermined number of respective communicating holes 31, 536 penetrating through the wall portion 534 from the upper surface part 534a in a thickness direction of the wall portion 534 and communicating with the space 7 on an inner circumferential side of the wall portion 534 are formed on the main body case 530. Both ends of the communicating hole 31 as a "(first) peripheral wall communicating hole" open toward the sounding body 5 in the sounding body case 490 and the transmitting panel 540 side, respectively. Both ends of the communicating hole 536 as a "second peripheral wall communicating hole" open toward the exterior space 498 of the sounding body case 490 and a side of a cylindrical wall portion 634 of the facing plate 630, which is described in greater detail hereinafter respectively.

An attachment end 632 of the facing plate 630 that is attached to the main body case 530 is crooked to the outer circumferential side so as to be formed into an annular stepped portion 632, to which an outer circumferential edge of the display panel 2 is attached. An end 635 of the wall portion 634 extending ahead from the stepped portion 632 on an opposite side from the display panel 2 is located with a clearance 650 between a rear portion of the transmitting panel 540 and the end 635. Accordingly, the wall portion 634 of the facing plate 630 bridging a gap between the display panel 2 and the transmitting panel 540 divides the space 7 between its inner and outer circumferential portions on the inner circumferential side of the wall portion 534 of the main body case 530, and a resonance part 670 of the space 7 surrounded by the wall portions 634, 534, the stepped portion 632, and the decorative board part 532 communicates with the communicating holes 31, 536. Because a space volume of the resonance part 670 is ensured in the circumferential direction, the sound wave propagated from the communicating hole 31 is amplified by resonant action using multipath reflection at components 634, 534, 632, 532.

A predetermined number of communicating holes 636 as a "partition communicating hole" passing through the wall portion 634 in its thickness direction are formed on the facing plate 630, and the communicating hole 636 communicates between the resonance part 670 of the space 7 and a remainder 672 of the space 7 facing the panels 2, 540. The communicating hole 636 of the facing plate 630 of the fifth embodiment is located generally directly beneath the communicating hole 31 communicating with the resonance part 670 on the opposite side from the sounding body 5.

In the fifth embodiment, a sound wave which has propagated to the resonance part 670 from the sounding body 5 through the communicating hole 31 enters directly into the communicating hole 636 generally directly beneath the communicating hole 31, or is resonantly amplified in the resonance part 670 so as to enter into the communicating hole 636. As a result, decrease in the sound pressure level of the sound wave, which has reaches the space remainder 672 between the panels 2, 540 through the communicating hole 636 having a small propagation loss, is limited. Therefore, the sound wave reliably propagates to the transmitting panel 540 directly or after reflections. Furthermore, in the fifth embodiment, the sound wave, which has been resonantly amplified in the resonance part 670, propagates to the transmitting panel 540 through the clearance 650 between the transmitting panel 540 and the facing plates 630. Accordingly, by sufficiently amplifying vibration of the transmitting panel 540 via these propagation paths, a propagation rate of the sound wave to a front space 462 by this vibration is maximized.

In the fifth embodiment, the sound wave, which has been resonantly amplified in the resonance part 670, propagates through the communicating hole 536 having a small propagation loss so as to leak out to the exterior space 498 of the sounding body case 490 on the outer circumferential side of the main body case 530. This leaked wave is reflected by the top plate part 452 of the instrument panel 450, similar to the leaked wave from the inside of the sounding body case 490 through the communicating hole 492 (as described in the fourth embodiment). Consequently, this leaked wave propagates from the exterior space 498 of the sounding body case 490 to the internal space 456 of the hood part 454. Therefore, the resonantly-amplified sound wave is propagated to the front space 462 of the transmitting panel 540 through the clearance 352 between the hood part 454 and the decorative board part 532.

As a result, in the fifth embodiment, the sound pressure level of auditory information at the front of the transmitting panel 540 is dramatically improved.

Other Embodiments

The embodiments of the invention are described above. Nevertheless, the invention is not interpreted by limiting itself to these described embodiments, and may be applied to various embodiments without departing from the scope of the invention.

For example, in the second embodiment, clearance 350, 352 in accordance with the third embodiment may be formed. In the third embodiment, the clearance 352 is not formed, and the leaked wave from the clearance 350 may be propagated to the front of the transmitting panel 340 by the vibration of the instrument panel 50.

In the fourth embodiment, at least one of the clearances 350, 352 does not need to be formed. When the clearance 352 is not formed, in particular, the leaked wave to the exterior space 498 of the sounding body case 490 may be propagated to the front of the transmitting panel 340 by the vibration of the instrument panel 450. In the fifth embodiment, at least one of the clearances 352, 650 does not need to be formed. When the clearance 352 is not formed, in particular, the leaked wave to the exterior space 498 of the sounding body case 490 may be propagated to the front of the transmitting panel 540 by the vibration of the instrument panel 450. Moreover, in the fifth embodiment, at least one of the communicating holes 492, 536, 636 does not need to be formed. Particularly when the communicating hole 636 is not formed, the resonant wave by the resonance part 670 may be propagated to the space remainder 672 or to the front of the transmitting panel 540 by the vibration of the facing plate 630 and the main body case 530. A sound wave is amplified through the resonance in the resonance part 670, and the resonance amplified wave propagates to the transmitting panel 540 through the wall portion 634 and the space remainder 672. Thus, in such a case, a sound pressure level of auditory information at the front of the transmitting panel 540 is heightened and thus, transmissibility of information is improved. When a sound pressure propagation effect of related components such as the sounding body 5 and the sounding body case 490 is great, or when a clearance left in assembling components has an effect that corresponds to the effect of the communicating hole 31, the communicating hole 31 does not need to be separately formed, and in such a case, an expensive forming mold does not need to be used if the related components are components shaped out of resin.

Sixth Embodiment

Figure 8:
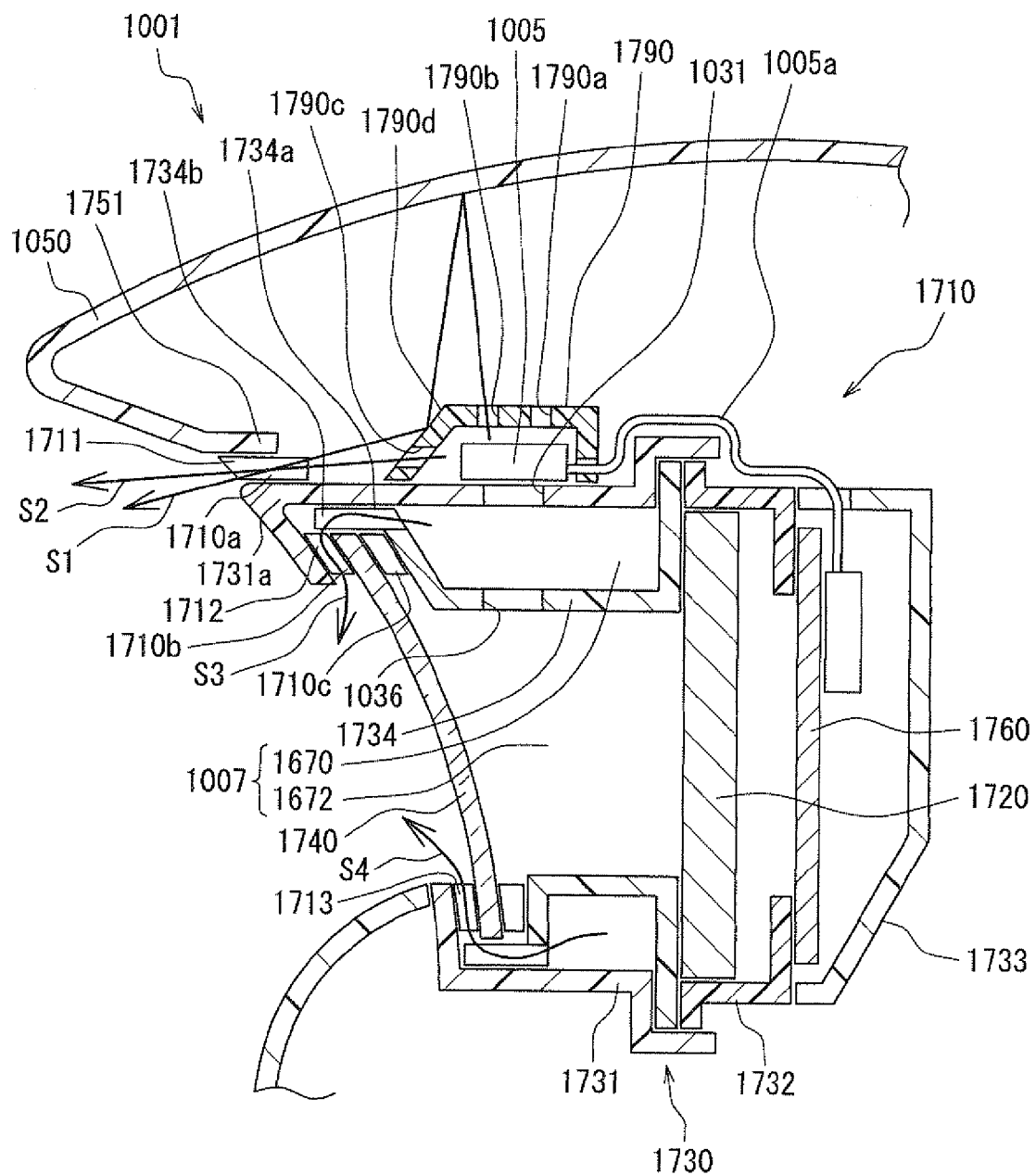
FIG. 8 is a sectional view illustrating a configuration of a vehicle display unit according to a sixth embodiment of the invention.
Figure 9:
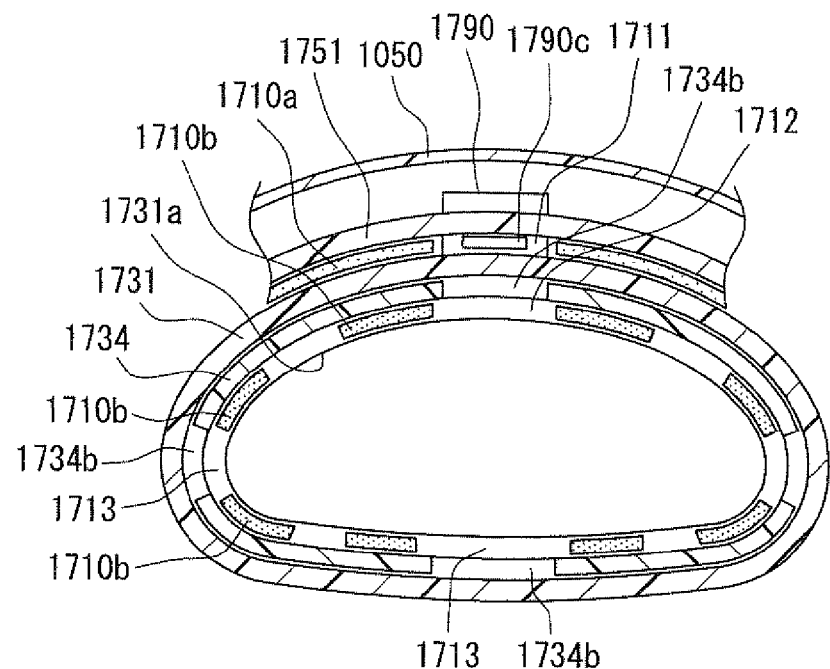
FIG. 9 is another sectional view illustrating the configuration of the vehicle display unit according to the sixth embodiment.

FIG. 8 illustrates a sectional view of a vehicle along its front-back direction, and FIG. 9 shows a cross section taken along a transmitting panel.

An instrument panel 1050 of the vehicle divides an opening which opens toward a passenger compartment. An upper part of the instrument panel 1050 is formed in the shape of eaves projecting toward the passenger compartment. The upper part of the instrument panel 1050 has a shape in which a plate shaped member is folded back on the passenger compartment side, and defines a hollow space in its inner part. An end edge 1751 of the instrument panel 1050 which is folded back divides an upper part of the opening. A meter unit 1710, which is a vehicle display unit 1001, is accommodated in the instrument panel 1050. The meter unit 1710 includes a cylindrical case 1730, a liquid crystal display 1720 as a display panel, a transmitting panel 1740, and an electric circuit unit 1760. The liquid crystal display 1720 is accommodated in the case 1730 with its display surface for displaying visual information facing the opening of an instrument panel 1050. The transmitting panel 1740 is fixed to an opening of the case 1730 such that the display surface of the liquid crystal display 1720 is visually identified from the inside of the passenger compartment through the panel 1740. The electric circuit unit 1760 is arranged on a back face side of the liquid crystal display 1720.

The case 1730 includes a cylindrical front case 1731, a cylindrical middle case 1732, and a roof-shaped rear case 1733. The liquid crystal display 1720 and the electric circuit unit 1760 are accommodated in and fixed to the case 1730. The case 1730 further includes a cylindrical facing member 1734 arranged between the liquid crystal display 1720 and the transmitting panels 1740. The front case 1731 and the facing member 1734 are "peripheral wall members" which surround a space 1007 between the display panel 1720 and the transmitting panel 1740 in the circumferential direction. The facing member 1734 is also a "partition member" which divides the space 1007 on the inner side of the front case 1731 into inner and outer portions. The partition member 1734 divides the columnar space 1007, which is between the display panel 1720 and the transmitting panel 1740, into two spaces 1670, 1672. One divided space 1672 is an inner space 1672 for display for visually-identifying a display range of the display panel 1720. The inner space 1672 functions as a "resonance part". The other divided space is an outer space 1670 located on an outer circumferential side of the columnar space 1672 for a display and extending in the circumferential direction along the front case 1731. At least the outer space 1670 functions as a "resonance part".

The facing member 1734 is accommodated inward of the front case 1731. The facing member 1734 has flanged portions at its both ends, and thereby has a groove portion extending along its outer circumference. As a result, the space 1670 elongated along the circumferential direction is defined between the facing member 1734 and front cases 1731. The space 1670 between the facing member 1734 and front cases 1731 extends annularly. The columnar space 1672 located between the liquid crystal display 1720 and the transmitting panel 1740 is defined in an inner part of the facing member 1734. The space 1670 and the space 1672 provide "resonance parts".

An upside surface of the front case 1731 extends forward generally straight. A buzzer 1005 as a sounding body is fixed on the upside surface of an outer circumferential surface of the front case 1731. A through hole 1031 is formed in a wall of the front case 1731 directly underneath the buzzer 1005. The hole 1031 allows propagation of a sound from the buzzer 1005 directly to the space 1670. A hole 1036 penetrating through the facing member 1734 is formed directly under the hole 1031. As a result of this configuration, the sound of the buzzer 1005 propagates directly to the air in the space 1672. The sound of the buzzer 1005 is propagated to the transmitting panel 1740 as well via the air in the space 1672, and accordingly, the transmitting panel 1740 vibrates.

A buzzer case 1790 as a covering member is fixed on the outer circumferential surface of the front case 1731 so as to cover the buzzer 1005. The buzzer 1005 and the electric circuit unit 1760 are electrically connected by a lead wire 1005a. The buzzer 1005 and the buzzer case 1790 are fixed on the upper surface of the front case 1731. The buzzer case 1790 has holes 1790a, 1790b, through which a sound is emitted, in its wall on an opposite side from a direction of sound emission from the buzzer 1005. The buzzer case 1790 has a hole 1790c, which faces forward, in its front wall. The buzzer case 1790 has an inclined plane 1790d as a guide face for reflecting and guiding a sound on its front wall.

The hole 1790c passed through the buzzer case 1790 so as to face the front of the transmitting panel 1740 along the outer circumferential surface of the front case 1731, which is a peripheral wall member. The inclined plane 1790d is also a reflecting surface which guides a reflected sound from outside the buzzer case 1790 to the front of the transmitting panel 1740 along the outer circumferential surface of the front case 1731. The hole 1790c and the inclined plane 1790d are guide means for guiding the sound of the sounding body to the front of the transmitting panel 1740 along the outer circumferential surface of the front case 1731. The guide means 1790c, 1790d are formed from the buzzer case 1790.

A leading edge 1731a of the front case 1731 extends to overhang a front face of the transmitting panel 1740. An end edge 1751 of the instrument panel 1050 extends in parallel with an upper surface of a cylindrical section of the front case 1731 without covering the leading edge 1731a. As a result, the leading edge 1731a is positioned to be visually identified from the vehicle interior. A clearance 1711 is at least partially formed between the leading edge 1731a of the front case 1731 and the end edge 1751 of the instrument panel 1050. Felt materials 1710a are arranged between the leading edge 1731a and the end edge 1751. The felt materials 1710a are disposed along the outer circumference of the meter unit 1710 a predetermined distance away from each other. The felt material 1710a has such thickness as to separate the leading edge 1731a from the end edge 1751 by a predetermined distance. The felt material 1710a may be attached on the leading edge 1731a or the end edge 1751.

As shown in FIG. 9, the clearance 1711 defined between an edge of the felt material 1710a and an edge of another felt 1710a is positioned at the front of the buzzer case 1790. The clearance 1711 is located in a direction in which the hole 1790c faces. The clearance 1711 defined between the felt materials 1710a provides a passage that communicates between a room divided in the instrument panel 1050 and the passenger compartment.

The transmitting panel 1740 is fixed such that it vibrates with respect to the case 1730. The transmitting panel 1740 is held between the front case 1731 and the facing members 1734. Felt materials 1710b, 1710c are arranged on both sides of the transmitting panel 1740 along its outer circumferential edge. The felt materials 1710b, 1710c have such thickness as to separate the transmitting panel 1740 from the leading edge 1731a of the front case 1731 by a predetermined distance. The felt materials 1710b, 1710c are members for fixing the transmitting panel 1740 in a state where the panel 1740 is easily vibrated. The felt materials 1710b, 1710c are arranged along the outer circumference of the transmitting panel 1740 a predetermined distance away from each other. Accordingly, the felt materials 1710b, 1710c only partly fix the transmitting panel 1740 with respect to the front case 1731 and the facing member 1734, which are members for fixing the transmitting panel 1740, and the rest of the panel 1740 is separated from these fixing members. As a result, the transmitting panel 1740 is fixed in a state where the panel 1740 is even more easily vibrated. The felt materials 1710b, 1710c may be attached on both sides of the transmitting panel 1740.

Grooves 1734b extending along the front-back direction are formed in a leading edge 1734a of the facing member 1734. Clearances 1712, 1713 having a slit shape are defined between the felt materials 1710b. One end of one groove 1734b communicates with the space 1670, and the other end of one groove 1734b communicates with the clearance 1712. One end of another groove 1734b communicates with the space 1670 and the other end of another groove 1734b communicates with the clearance 1713. Consequently, a passage from the space 1670 to the front of the transmitting panel 1740 is provided by the groove 1734b and the clearances 1712, 1713. This passage guides a sound from the space 1670, which is the resonance part, to the front of the transmitting panel 1740.

As shown in FIG. 9, the felt materials 1710b are arranged to be spread almost evenly along the outer circumferential edge of the transmitting panel 1740. The felt materials 1710b divide the clearance 1712 located closest to the buzzer 1005 from the clearance 1713 which is away from the buzzer 1005 in the circumferential direction. The grooves 1734b of the facing member 1734 are provided in positions corresponding to the clearances 1712, 1713. As a result, passages communicating between the space 1670 and a front face side of the transmitting panel 1740 are defined. A passage extending from the vicinity of the buzzer 1005 in the space 1670 and a passage extending from a position distant from the buzzer 1005 in the space 1670 are included in these passages.

In the above-described configuration, when the buzzer 1005 emits a sound, a warning beep or the like, the sound is propagated to the vehicle interior via vibration of air and vibrations of members such as the front case 1731. A sound of the buzzer 1005 is emitted to the inside of the instrument panel 1050 through the holes 1790a, 1790b. The sound is reflected by the inside of the instrument panel 1050, and propagates to the vehicle interior through the clearance 1711. As indicated by an arrow S1, the sound is reflected by the inclined plane 1790d as well so as to be guided to the clearance 1711. A sound reflected multiple times by the inside of the instrument panel 1050 is led to the clearance 1711 by the inclined plane 1790d. The inclined plane 1790d is located in an extension of the clearance 1711. Shapes of the inclined plane 1790d such as its position and angle may be set so as to guide a sound toward the clearance 1711 according to positions of the holes 1790a, 1790b, a shape of an inner surface of the instrument panel 1050 and the like. The clearance 1711 defined between the instrument panel 1050 and the meter unit 1710 provides the passage S1 for a reflected sound. Because of this configuration, a sound which has propagated via a hollow space in the instrument panel 1050 is guided efficiently to the vehicle interior. A sound is emitted toward the driver in the vehicle interior along the passage S1.

The sound of the buzzer 1005 is emitted straight as well as directly toward the clearance 1711 through the hole 1790c, and then propagates to the vehicle interior. For example, as indicated by an arrow S2, a sound is guided along a route straight from the buzzer 1005 to the vehicle interior. The clearance 1711 defined between the instrument panel 1050 and the meter unit 1710 provides the passage S2 for the directly emitted sound. As a result of this configuration, the sound emitted from the buzzer 1005 is led out to the vehicle interior comparatively directly. A sound is emitted to the driver in the vehicle interior along the passage S2.

A surface of the meter unit 1710, on which the buzzer 1005 is mounted, is located on generally the same surface as the clearance 1711 between the instrument panel 1050 and the meter unit 1710. Accordingly, the hole 1790c and the inclined plane 1790d contribute to guiding out the sound of the buzzer 1005 directly along the passages S1, S2.

The sound of the buzzer 1005 is introduced to the space 1670 through the hole 1031. The space 1670 functions as a resonance chamber, and emphasizes particularly a low-frequency component of the sound of the buzzer 1005. As indicated by arrows S3, S4, the sound in the space 1670 is introduced to the vehicle interior along passages through the groove 1734b and the clearances 1712, 1713. The sound is guided out comparatively directly from the buzzer 1005 through a route near the buzzer 1005 indicated by the arrow S3. The passage S3 extends from a position in the space 1670 directly under the buzzer 1005. The sound adjusted by the space 1670 is guided out through a route indicated by the arrow S4 which is away from the buzzer 1005. A position in the space 1670 from which the passage S4 extends is further away from the buzzer 1005 than that of the passage S3. The passage S4 extends from a position in the space 1670 farthest from the buzzer 1005. Because of this configuration, a desirable tone color is obtained. The clearances 1712, 1713 defined between the transmitting panel 1740 and front cases 1731 provide the passages S3, S4 for the resonances. A sound is emitted along a surface of the transmitting panel 1740 on the passenger compartment side through the clearances 1712, 1713 for the passages S3, S4 having a slit shape.

The passages S3, S4 are arranged in an almost evenly dispersed manner over the whole peripheral part of the transmitting panel 1740. As a result, an effect of a sound being emitted from the whole transmitting panel 1740 is produced.

The sound of the buzzer 1005 vibrates the transmitting panel 1740. The transmitting panel 1740 is held and fixed via the felt materials 1710b, 1710c in a state where the panel 1740 is easily vibrated. The felt materials 1710b, 1710c fix the transmitting panel 1740 partially, and the rest of the panel 1740 is held in a freely floating manner by the felt materials 1710b, 1710c. Accordingly, the transmitting panel 1740 is held and fixed in a state where the panel 1740 is even more easily vibrated. According to this configuration, a sound is generated from the transmitting panel 1740 facing the vehicle interior.

The sound of the buzzer 1005 vibrates the transmitting panel 1740 through members such as the facing member 1734. A part of the sound of the buzzer 1005 sometimes vibrates the transmitting panel 1740 via air in the space 1672. Since the space 1672 functions also as a resonance chamber, the transmitting panel 1740 may vibrate so as to generate a comparatively low-pitched sound.

Seventh Embodiment

Figure 10:
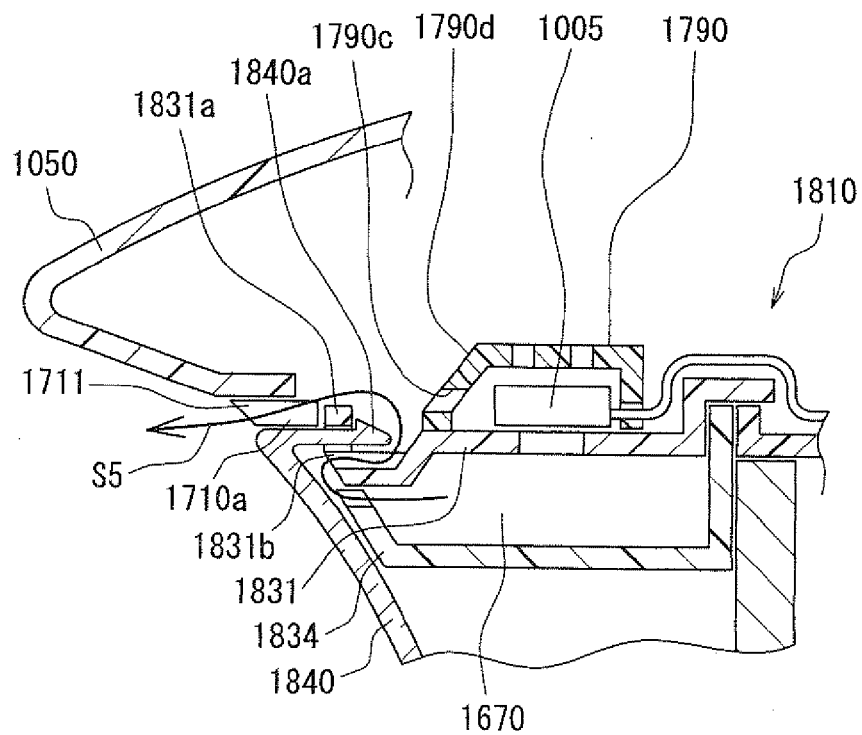
FIG. 10 is a sectional view illustrating a configuration of a vehicle display unit according to a seventh embodiment of the invention.

FIG. 10 illustrates a sectional view of a vehicle display unit 1 along a front-back direction of a vehicle. FIG. 10 mainly shows differences with FIG. 8.

A meter unit 1810 has generally the same configuration as the sixth embodiment. Nevertheless, there are differences in its configuration relevant to a transmitting panel. A transmitting panel 1840 is positioned so as to cover a front opening of a front case 1831. An outer circumferential edge of the transmitting panel 1840 is positioned between the front case 1831 and an instrument panel 1050. The transmitting panel 1840 is fixed to the front case 1831 via its engaging part. The transmitting panel 1840 defines a clearance for a sound path without using a felt material.

The transmitting panel 1840 has an engaging claw 1840a. The engaging claws 1840a are provided at an outer circumferential edge of the transmitting panel 1840 at generally regular intervals. The front case 1831 has engaged portions 1831a for receiving the engaging claw 1840a at its front edge portion. The engaging claw 1840a and the engaged portion 1831a constitute the engaging part. The engaging claws 1840a partly fix the transmitting panel 1840, and the rest of the panel 1840 is held away from the front case 1831 and a facing member 1834. Accordingly, the transmitting panel 1840 is fixed in a state where the panel 1840 is relatively easily vibrated.

Grooves are formed at the edges of the front case 1831 and the facing member 1834 to provide passages for propagating a sound. When the engaging claw 1840a is positioned in a specified position of the engaged portion 1831a, a clearance 1831b for propagating a sound having a slit shape, is defined between the transmitting panel 1840 and the front cases 1831. As a result, as indicated by an arrow S5, a passage leading to the vehicle interior at the front of the transmitting panel 1840 through the clearance 1711 after passing through the inside of an instrument panel 1050 from a space 1670 is provided.

Although not shown, a non-transmitting part for making invisible the facing member 1834, the clearance 1831b, a user-side opening configuration of the front case 1831 and the like to an occupant of the vehicle or a user is provided. The non-transmitting part may be formed using a non-transmitting coating such as black applied to a surface or rear face of the transmitting panel 1840. Alternatively, instead of the non-transmitting coating, non-transmitting resin and a transmitting panel as the non-transmitting part may be formed by insert molding.

Other Embodiments

Technical scope of the invention is not limited only to the sixth and seventh embodiments, and those embodiments may be varyingly modified, improved or expanded within the technical scope of the invention. For example, modifications described below may be employed.

Instead of a display using a image, such as the liquid crystal display 1720, an analog indicator having a pointer, or both of the above, may be provided as the display panel.

The resonance part may have required length in the direction of propagation of the sound from the buzzer 1005. Instead of the annular space 1670, an arc-shaped space extending only in a certain range along the circumferential direction may be formed between the front case 1731 and the facing members 1734. The front case 1731 and the facing member 1734 provide the peripheral wall in collaboration with each other. Therefore, the facing member 1734 may have a cylindrical shape, and the front case 1731 may have a half-cylindrical shape without having a lower hem. Facing members having display areas for a speed, engine rotation speed and the like and surrounding each area may be provided.

Only one of the passages S3, S5 extending from the vicinity of the buzzer 1005 and the passage S4 extending from a position distant from the buzzer 1005 may be provided as a passage shown by the arrows S3, S4, S5 extending from the inside of the space 1670. A member for forming a clearance between members may be provided using sponge, rubber, or a protrusion projecting from one member or both members, instead of a felt material. A member, which does not easily attenuate a sound that is expected to be emitted through the passages S1, S2, S3, S4, S5, may be provided in the passages S1, S2, S3, S4, S5. For example, a coarse sponge may be disposed in the passages S1, S2.

Only one of the hole 1790c and the inclined plane 1790d may be provided for the buzzer case 1790.

The front case 1731 does not need to have the hole 1031. According to this configuration, a part of the sound of the buzzer 1005 is propagated to the space 1670 even without the hole 1031. In order to form the hole 1031 of the front case 1731, a slide core needs to be provided in a metal mold at the time of resin molding, and molding using this slide core is necessary, so as to increase the cost. However, according to this configuration, employment of a complicated forming die and the cost increase involved in this are avoided.

The hole 1036 does not need to be formed in the facing members 1734, 1834. According to this configuration, appearance of the facing member is improved. According to this configuration, a part of the sound of the buzzer 1005 is propagated to the space 1672 even without the hole 1036. The hole 1036 formed in the facing member 1734 or 1834 may be provided away from the hole 1031. For example, the hole 1036 may be formed in a wall of the facing member 1734 illustrated in a lower part of FIG. 8. According to this configuration, the sound adjusted by the space 1670 is propagated to the inside of the space 1672, and then the sound is propagated to the transmitting panel 1740. In regard to the felt materials 1710b, 1710c provided on both sides of the transmitting panel 1740, only one of the felt materials 1710b, 1710c may be provided.

Because the holes 1031, 1036 have a function of adjusting frequency and/or tone quality in addition to a sound pressure generated, the hole may have a shape such as a quadrangle or circle and a small/large size, and more than one hole may be formed in order to satisfy the other specifications such as the above-described cost and/or appearance, when predetermined improvement in the sound pressure is ensured. Additionally, the holes 1031, 1036 do not need to be formed.

Instead of the felt material as a member for holding the transmitting panel 1740 such that it easily vibrates, a material having deformable cushioning characteristics which allows the vibration of the transmitting panel 1740 may be used. For example, sponge or rubber may be used. The engaging part as a "fixing means" for holding the transmitting panel 1840 such that it easily vibrates may be constituted also of an engaging claw formed at the front case 1831 and an engaged portion formed at the transmitting panel 1840. Furthermore, the engaging part and a cushioning material may be used together.

The auditory information by means of a buzzer may be provided in the form of a chord, melody, voice or the like by employing a loudspeaker or the like, in addition to a single-shot, continuous, or intermittent sound such as warning and/or operation alarm.

In addition, the groove 1734*b*, the passage S3, the clearance 1712, the passage S4, the clearance 1713, the passage S5, the clearance 1831*b*, the hole 1790*c*, and the inclined plane 1790*d* function also as "leading means" for leading the sound of the buzzer 1005 to the front of the transmitting panel 1740 or the transmitting panel 1840.

Additional advantages and modifications will readily occur to those skilled in the art. The invention in its broader terms is therefore not limited to the specific details, representative apparatus, and illustrative examples shown and described.

What is claimed is:

1. A vehicle display unit for a vehicle comprising:
    a display panel facing a vehicle interior of the vehicle and configured to display visual information to a vehicle occupant of the vehicle;
    a transmitting panel disposed on a vehicle interior side of the display panel, wherein the visual information is transmitted to the vehicle occupant through the transmitting panel;
    a peripheral wall member surrounding a space between the display panel and the transmitting panel in a circumferential direction of the display panel; and
    a sounding body attached on an outer circumferential surface of the peripheral wall member and configured to provide auditory information for the vehicle occupant by generating a sound wave, wherein the peripheral wall member has a communicating hole, which opens toward the sounding body and communicates with the space.

2. The vehicle display unit according to claim 1, wherein the communicating hole opens toward the transmitting panel.

3. The vehicle display unit according to claim 1, wherein:
    the peripheral wall member bridges a gap between the display panel and the transmitting panel; and
    the peripheral wall member and the transmitting panel define a clearance therebetween.

4. The vehicle display unit according to claim 1, further comprising a covering member which covers the sounding body from an opposite side from the communicating hole.

5. The vehicle display unit according to claim 4, wherein:
    the peripheral wall member has a peripheral wall communicating hole as the communicating hole; and
    the covering member has a cover communicating hole that communicates between an interior portion of the covering member, which accommodates the sounding body, and an exterior portion of the covering member.

6. The vehicle display unit according to claim 5, further comprising a propagation member, wherein a surface of the propagation member facing an outer circumferential side of the peripheral wall member, which is the exterior portion of the covering member, reflects the sound wave so as to propagate the reflected wave to a vehicle interior side of the transmitting panel.

7. The vehicle display unit according to claim 6, wherein the propagation member and one of the peripheral wall member and the transmitting panel define a clearance therebetween, the clearance communicating between the outer circumferential side of the peripheral wall member and the vehicle interior side of the transmitting panel.

8. The vehicle display unit according to claim 7, wherein the propagation member propagates the sound wave to the vehicle interior side of the transmitting panel through single reflection and multiple reflection.

9. The vehicle display unit according to claim 6, wherein the propagation member propagates the sound wave to the vehicle interior side of the transmitting panel through single reflection and multiple reflection.

10. The vehicle display unit according to claim 1, further comprising a partition member which divides the space on an inner circumferential side of the peripheral wall member, wherein the communicating hole communicates with a resonance part of the space, which is surrounded with the partition member and the peripheral wall member and extends in the circumferential direction so that the sound wave resonates in the resonance part, on an opposite side from the sounding body.

11. The vehicle display unit according to claim 10, wherein:
    the partition member bridges a gap between the display panel and the transmitting panel; and
    the partition member and the transmitting panel define a clearance therebetween.

12. The vehicle display unit according to claim 10, wherein:
    the peripheral wall member has a peripheral wall communicating hole as the communicating hole; and
    the partition member has a partition communicating hole which communicates between the resonance part of the space and the other part of the space facing the transmitting panel.

13. The vehicle display unit according to claim 10, wherein the peripheral wall member has a first peripheral wall communicating hole as the communicating hole and a second peripheral wall communicating hole which communicates between the resonance part and an outer circumferential side of the peripheral wall member.

14. The vehicle display unit according to claim 13, further comprising a propagation member, wherein a surface of the propagation member facing an outer circumferential side of the peripheral wall member, into which the second peripheral wall communicating hole opens, reflects the sound wave so as to propagate the reflected wave to a vehicle interior side of the transmitting panel.

15. The vehicle display unit according to claim 14, wherein the propagation member and one of the peripheral wall member and the transmitting panel define a clearance therebetween, the clearance communicating between the outer circumferential side of the peripheral wall member and the vehicle interior side of the transmitting panel.

16. The vehicle display unit according to claim 15, wherein the propagation member propagates the sound wave to the vehicle interior side of the transmitting panel through single reflection and multiple reflection.

17. The vehicle display unit according to claim 14, wherein the propagation member propagates the sound wave to the vehicle interior side of the transmitting panel through single reflection and multiple reflection.

18. The vehicle display unit according to claim 1, further comprising a control circuit which is disposed on an opposite side of the display panel from the transmitting panel, wherein the control circuit and the sounding body are electrically connected by a lead wire, so that the control circuit controls the sounding body.

* * * * *